May 12, 1925. 1,537,140
P. RUSSELL ET AL
DENTAL UNIT
Filed Aug. 18, 1922 3 Sheets-Sheet 1

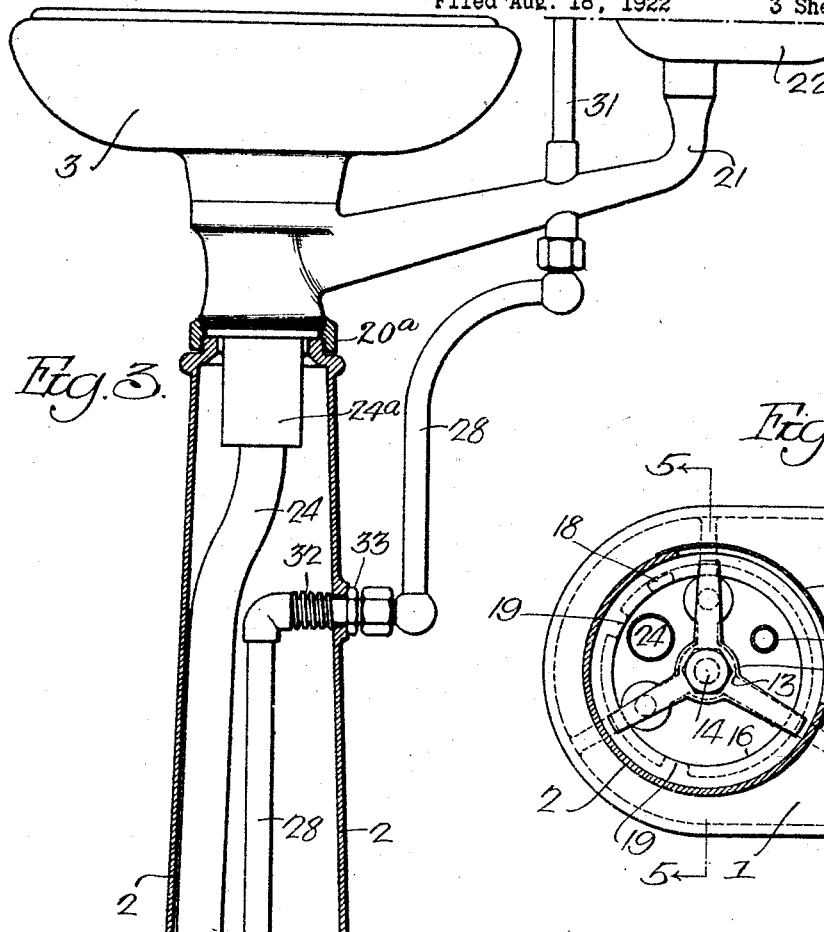

Patented May 12, 1925.

1,537,140

UNITED STATES PATENT OFFICE.

PERCY RUSSELL, OF SWARTHMORE, PENNSYLVANIA, ADOLPH W. SCHRAMM, OF RIVERTON, NEW JERSEY, AND ROBERT S. WOODWARD, JR., OF HAVERFORD, PENNSYLVANIA, ASSIGNORS TO ELECTRO DENTAL MANUFACTURING COMPANY, OF PHILADELPHIA, PENNSYLVANIA, A CORPORATION OF PENNSYLVANIA.

DENTAL UNIT.

Application filed August 18, 1922. Serial No. 582,716.

*To all whom it may concern:*

Be it known that we, PERCY RUSSELL, ADOLPH W. SCHRAMM, and ROBERT S. WOODWARD, Jr., citizens of the United States, residing in Swarthmore, Pennsylvania, Riverton, New Jersey, and Haverford, Pennsylvania, respectively, have invented a Dental Unit, of which the following is a specification.

One object of our invention is to provide a novel and convenient arrangement and mounting for the apparatus required by a dental operator, and the invention more particularly contemplates the provision of a novel supporting structure especially designed to permit such apparatus to be mounted thereon in independent units as these are acquired from time to time by the operator.

A further object of our invention is to provide a novel form of containing structure capable of receiving certain apparatus and connections therefor and formed to carry one or more pieces of apparatus, the arrangement being such as to permit such devices as a dental engine and a dental switch board bracket table being movably supported, either with or without a light-supporting structure.

We further desire to provide a novel combination of apparatus and supporting structure therefor especially designed to permit of the convenient mounting and adjustment of the apparatus.

These objects and other advantageous ends we attain as hereinafter set forth, reference being had to the accompanying drawings, in which, Fig. 1 is a side elevation illustrating a complete dental unit constructed in accordance with our invention;

Fig. 3 is an elevation of the cuspidor and certain of its attachments, with its supporting column in vertical section;

Fig. 4 is a horizontal section on the line 4—4, Fig. 3;

Fig. 5 is a fragmentary vertical section on the line 5—5, Fig. 4;

Fig. 8 is a vertical section on the line 8—8, Fig. 2; and

Fig. 9 is a horizontal section on the line 9—9, Fig. 8.

Figure 1:
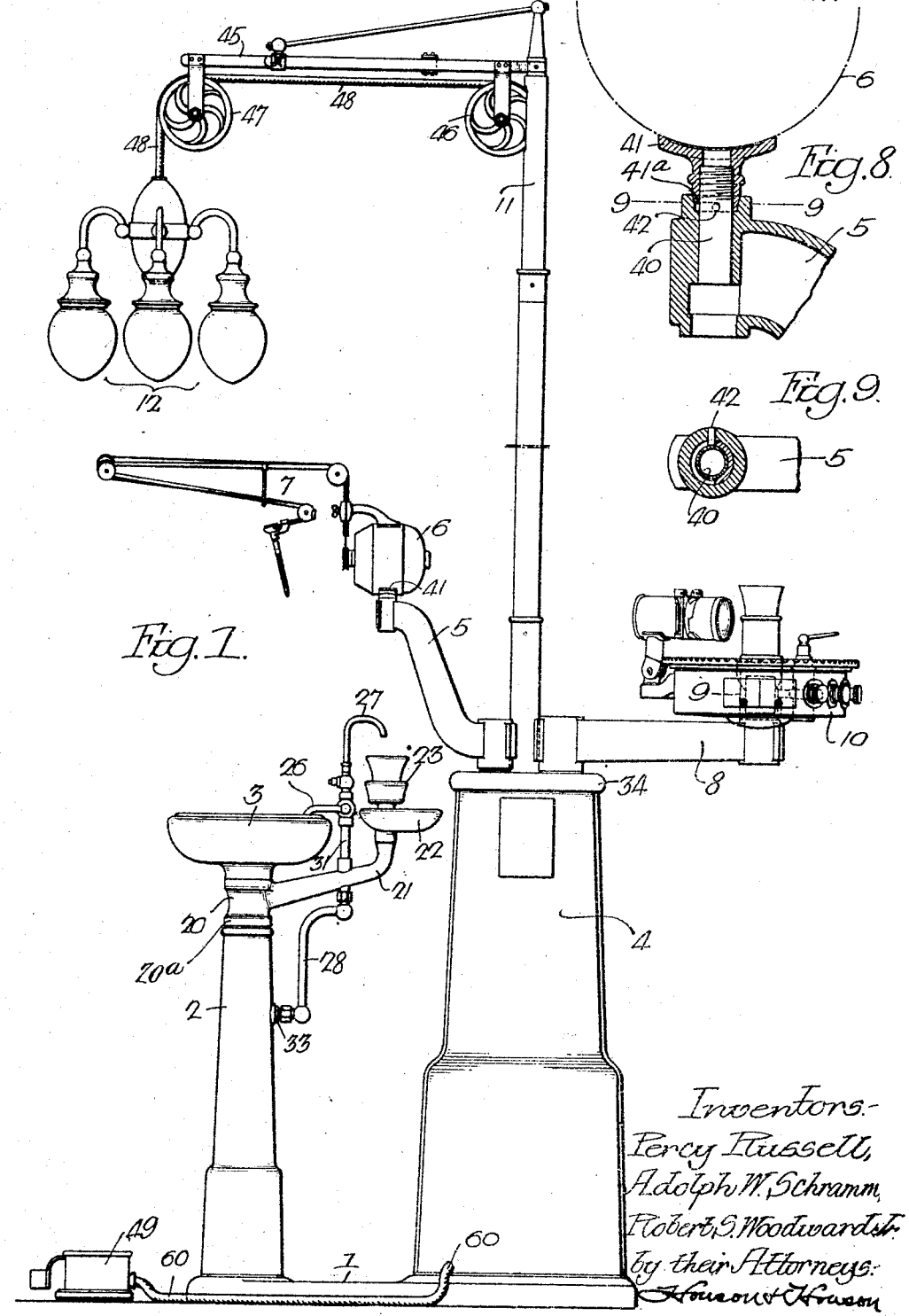
Figure 2:
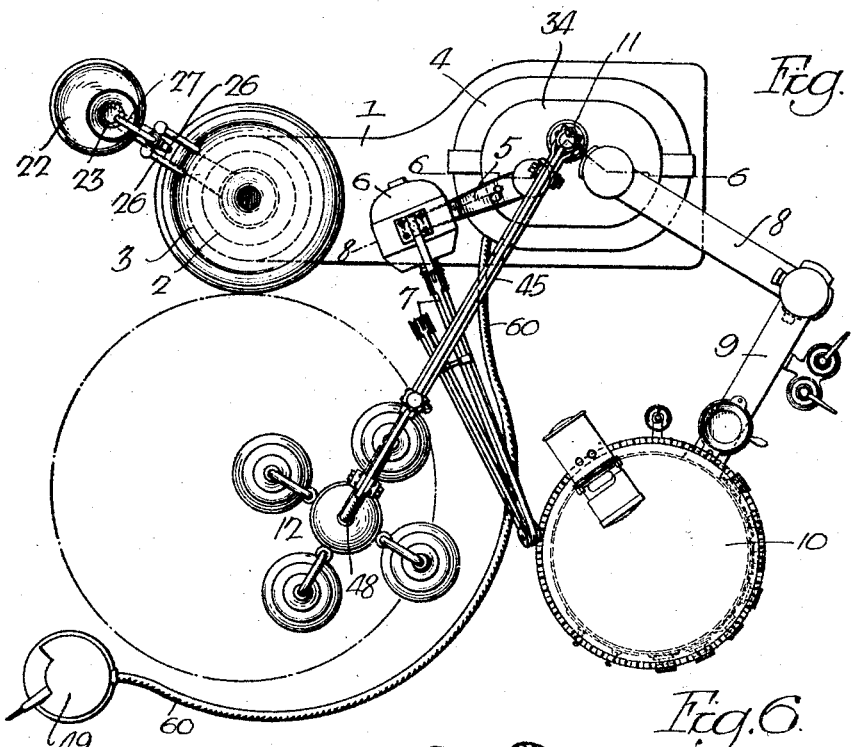
Fig. 2 is a plan of the apparatus shown in Fig. 1, with certain pieces of said apparatus occupying positions different from those in the preceding figure, in order to more clearly illustrate their structure.

In the above drawings 1 represents a more or less elongated, generally flat base structure on which in accordance with our invention is mounted a standard 2 for a cuspidor 3 and a hollow pedestal structure 4, in the present instance illustrated as carrying an arm 5 for a dental engine motor 6 and its head 7, a pair of articulated arms 8 and 9 for a dental instrument cabinet or switchboard bracket table 10 and a vertically extending pole 11 for a lamp cluster 12.

As shown in Figs. 3, 4, and 5, the base structure 1 has adjacent one end an approximately circular opening across which extends a spider structure 13 centrally tapped for the reception of a bolt 14 designed to act through a three-armed clamp 15 to hold the standard 2 rigidly in position on said base, the feet of same clamp engaging a flange 16 projecting inwardly from the lower and larger end of said standard. Access to the interior of this standard is had through an opening closed by a suitably formed plate 17, and as indicated on Fig. 4, said standard has projecting downwardly from its bottom edge a lug 18 fitting into the opening of the base structure and designed to permit of its rotative adjustment on a vertical axis between limits defined by a pair of stops in the form of lugs 19 projecting inwardly from the opening in the base.

Interposed between the cuspidor 3 (Figs. 1 and 3) and the standard is a tubular fitting 20 held to the latter by a clamping ring 20$^a$ and having a hollow arm 21 extending outwardly and upwardly, carrying a cup 22 and a glass holder 23 on its outer end. The cup 22 drains through this arm of the fixture 20 which likewise receives liquid from the cuspidor and delivers it through a suitable stuffing box 24$^a$ to a drain pipe 24 extending downwardly through the standard 2, there being a union 25 in this pipe slightly above the opening into the base structure 1 so as to be conveniently accessible through the opening closed by the plate 17.

Water is supplied to the cuspidor 3 and to the glass in the holder 23 through a pair of outlets 26 and 27 supplied from a pipe 28 passing into the standard from the base structure 1 through the opening thereof. This conduit includes a union 29 within the lower part of the standard and a valve 30 and passes laterally out of the upper part of the standard, where it is connected to the lower end of a pipe 31 passing through and supported by the arm 21 and having the outlets 26 and 27 connected to its upper end. A spring 32 is preferably mounted on the short length of the pipe 28 between an L fitting on its inner wheel portion and the side of the standard and this length of pipe is maintained under tension by a nut 33 threaded upon it outside of said standard which compresses the spring so as to prevent rattling or other objectionable movement of said pipe.

Figure 6:
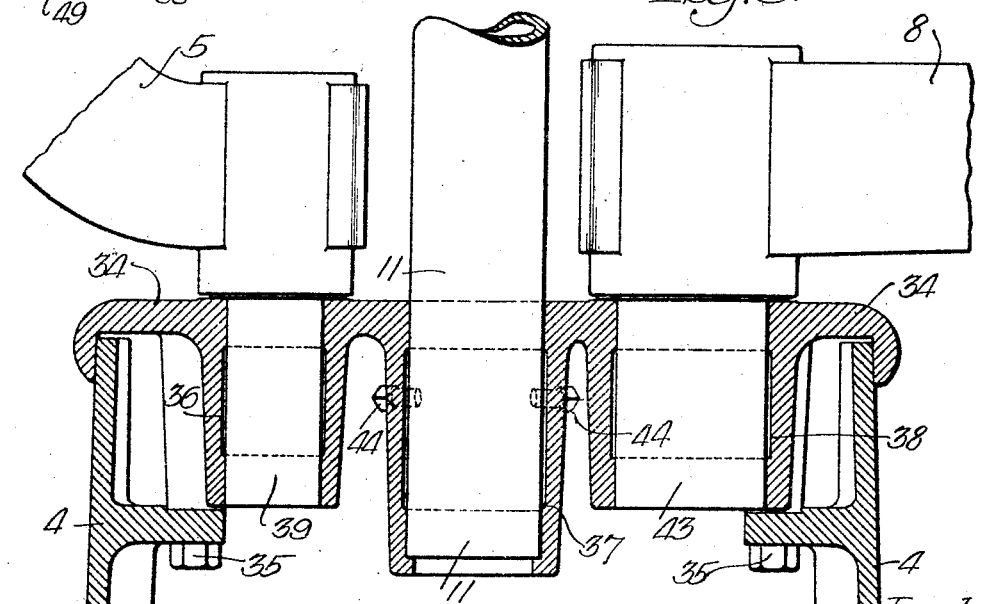
Fig. 6 is an enlarged vertical section of the top of the pedestal and taken on the line 6—6, Fig. 2.

As shown in Fig. 6, the otherwise open top of the pedestal 4 is normally closed by a relatively heavy cover structure 34 downwardly flanged to closely fit the upper end of the pedestal and rigidly held thereto by bolts 35. This cover is formed with any suitable number of upwardly opening sockets, in the present instance three, indicated at 36, 37 and 38. The first of these sockets is designed to removably receive the pintle or pivot portion 39 of the lower end of the arm 5, whose upper end is likewise formed with a socket to receive the vertical pivot or pintle 40, Figs. 8 and 9, which carries the saddle 41 supporting the dental engine 6—7. The saddle structure with the pintle is free to rotate through an angle of substantially 180° as determined by the pin 42 projecting into the socket and the saddle has a tapered portion 41ᵃ fitting a correspondingly tapered recess so designed that the friction between them is sufficient to prevent rotation of the motor in the arm 5 when the engine head 7 is swung horizontally while permitting such rotation when it is desired to change the position of the motor.

The dental cabinet consists of a flat, substantially cylindrical casing carried at the outer end of the arm 9 whose inner end is movably connected to the outer end of the arm 8. As shown in Fig. 6, the inner end of this latter arm has a downwardly extending pivot portion 43 rotatably fitting the socket 38. While the cabinet 10 and its associated arms may have any desired or suitable construction, they are preferably made as described and claimed in U. S. Patent 1,491,739, issued to Percy Russell.

The third socket 37 is inwardly flanged at its lower end and serves to receive the lower end of the pole or standard 11, which is rigidly held in place by set screws 44. This pole at its upper end carries a suitably braced horizontal member 45 from which are suspended the bearings for a pair of pulleys 46 and 47 designed to receive the supporting and current-conducting cable 48 which at one end carries the light cluster 12 and at the other end extends into the hollow pole 11 through which it passes to the pedestal 4, within which it is suitably counterweighted and connected to current supply conductors.

The standard 4, in addition to suitable electrical conductors for supplying the various pieces of apparatus above referred to, preferably contains an electrically actuated air compressor, current transformers, and other apparatus (not shown) also required for the suitable operation of the apparatus of the dental cabinet, the dental engine being governed by a suitable foot controller 49 from which current conductors are run through a cable 60 to the pedestal 4 and are connected from thence to a source of supply and to said engine motor.

Figure 7:
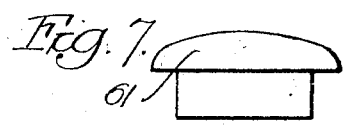
Fig. 7 is an elevation of one of the caps, which may be used to close the openings into the sockets for certain of the pieces of apparatus when these are not used.

From the above description it will be appreciated that the apparatus shown in Fig. 1 represents an assemblage of devices customarily required by a dental operator. By virtue of the peculiar construction of these devices and of their supporting structure, it is possible for the operator who is beginning to collect the instruments required by his profession, to first purchase the base 1, the pedestal 4, the standard 2 and the cuspidor with its fixtures and the dental engine together with a partly equipped bracket table if desired. These parts are mounted as shown and the socket 37 in the cover 34 of the pedestal is temporarily closed by a cap such as that shown at 61 in Fig. 7. Thereafter, if desired, the light equipment may be added and the pole 11 inserted in its socket 37. Finally when the collection of apparatus is to be completed, the fully equipped dental cabinet or switchboard bracket table 10, with its supporting arms is likewise added, although obviously it is possible for any of these pieces of apparatus to be used with the pedestal and base, either with or without one or more of the other pieces of apparatus, thus giving the utmost flexibility and making possible the gradual collection of the various pieces of apparatus or devices without necessitating the expenditure at one time of the amount necessary to purchase all of them.

Moreover by mounting all of the above described devices upon a single base structure, they may be permanently positioned in the place found most convenient by the operator, while at the same time the dental engine and cabinet may be conveniently swung on vertical axes and at the time of installation the standard 2 and cuspidor 3 may be adjusted relatively to the base to cause the arm 21 with the cup and glass holder to project in any desired direction.

From a manufacturing standpoint the apparatus is of such a nature as to be easily and quickly assembled and its various parts are likewise easily accessible for inspection, adjustment or repair. At the same time the installation as a whole is substantial, durable and of a highly ornamental nature owing to the construction and mounting of the various parts.

It is to be noted that when the cuspidor and glass holder are to be adjusted, this is made possible since the standard may be turned on a vertical axis passing through the bolt 14, the pipe 28 and the stuffing box 24ᵃ, after the water valve 30 has been closed, and the bolt 14 and union nut 29 sufficiently loosened.

We claim:

1. The combination of a base structure having an opening therein; a standard substantially concentric with said opening; means for clamping said standard to the base structure formed to permit adjustment of the standard about its vertical axis; a water receptacle mounted on the standard; and water conductors for said receptacle extending through the standard and the opening in the base.

2. The combination of a base structure having an opening therein; a standard substantially concentric with said opening; means for clamping said standard to the base structure formed to permit adjustment of the standard about its vertical axis; a water receptacle mounted on the standard; and water conductors for said receptacle extending through the standard and the opening in the base, said conductors including adjustable joints coaxial with the standard.

3. The combination of a hollow base structure having an opening therein; a standard inwardly flanged at its lower end and mounted on the base structure in line with the opening; a spider in the base structure; a clamp in the standard engaging the flange thereof, and a bolt passing through said clamp into the spider of the base structure.

PERCY RUSSELL.
ADOLPH W. SCHRAMM.
ROBERT S. WOODWARD, Jr.